(12) United States Patent
King et al.

(10) Patent No.: US 7,527,845 B2
(45) Date of Patent: May 5, 2009

(54) CONNECTION ELEMENT STRUCTURE FOR A NON-TEXTILE FABRIC

(75) Inventors: William L. King, Denver, CO (US); Gregory W. O'Connor, Littleton, CO (US); Berkley B. Thornton, Jr., Littleton, CO (US)

(73) Assignee: Samsonite Corporation, Mansfield, MA (US)

( * ) Notice: Subject to any disclaimer, the term of this patent is extended or adjusted under 35 U.S.C. 154(b) by 0 days.

(21) Appl. No.: 10/491,923

(22) PCT Filed: Nov. 28, 2001

(86) PCT No.: PCT/US01/44478

§ 371 (c)(1), (2), (4) Date: May 17, 2004

(87) PCT Pub. No.: WO02/43955

PCT Pub. Date: Jun. 6, 2002

(65) Prior Publication Data

US 2004/0192138 A1 Sep. 30, 2004

(51) Int. Cl.
B32B 3/10 (2006.01)
(52) U.S. Cl. .......................................... 428/53; 190/124
(58) Field of Classification Search .................. 428/52, 428/53, 33; 190/124; 446/115; 2/2.5; 150/127; 52/DIG. 10
See application file for complete search history.

(56) References Cited

U.S. PATENT DOCUMENTS

| | | | |
|---|---|---|---|
| 2,388,297 A | 11/1945 | Slaughter | |
| 3,661,689 A | 5/1972 | Spanier | |
| 3,746,602 A | 7/1973 | Carolii et al. | |
| 3,993,725 A | 11/1976 | Brown | |
| 4,055,019 A * | 10/1977 | Harvey | 446/115 |
| 4,090,322 A * | 5/1978 | Hake | 446/104 |
| 4,115,489 A * | 9/1978 | Macfee | 264/445 |
| 4,229,496 A | 10/1980 | Striegel | |
| 4,442,150 A | 4/1984 | Greiner et al. | |
| 4,559,251 A | 12/1985 | Wachi | |
| 5,183,430 A * | 2/1993 | Swann | 446/104 |
| 5,316,820 A | 5/1994 | Harpell et al. | |

(Continued)

FOREIGN PATENT DOCUMENTS

EP 0121433 A1 10/1984

(Continued)

Primary Examiner—Alexander Thomas

(57) ABSTRACT

Non-textile fabric panels (FIG. 17) are either formed, formed and joined, or joined by using plates or elements 1, 2, 51, 52 having edges with connection structures of complementary shaped and spaced knuckles 54, 55, 58 that interfit with one another. The knuckles include surfaces 57, 56, 59, that interfit and engage similar structures on adjacent elements or plates. Aligned, interfitting connection structures or knuckles can hinge along major bending axes, giving the non-textile fabric made thereby the ability to flex and bend like textile fabric or leather. Buttressing surfaces 7, 57 between connected knuckles help prevent early disengagement of intermitting surfaces when the non-textile fabric is subjected to strong tensile forces. Elements 51, 52 having the overall shape of a right isoscoles triangle in the plane of the non-textile fabric formed therefrom thus provide four major bending axes for superior flexible strength. Knuckles 22, 24 on the free edges of non-textile fabric panels made according the invention can be interleaved in a post manufacturing operation to make strong and almost invisible seams between panels.

14 Claims, 16 Drawing Sheets

U.S. PATENT DOCUMENTS 6,116,980 A 9/2000 Bauer et al.

FOREIGN PATENT DOCUMENTS

| | | |
|---|---|---|
| EP | 0357282 A1 | 3/1990 |
| EP | 0955515 A1 | 11/1999 |
| GB | 2 287 639 A | 9/1995 |
| JP | 2000-186899 A1 | 4/2000 |
| WO | WO 93/21495 | 10/1993 |
| WO | WO 95/07033 | 3/1995 |
| WO | WO 98/00039 | 1/1998 |

* cited by examiner

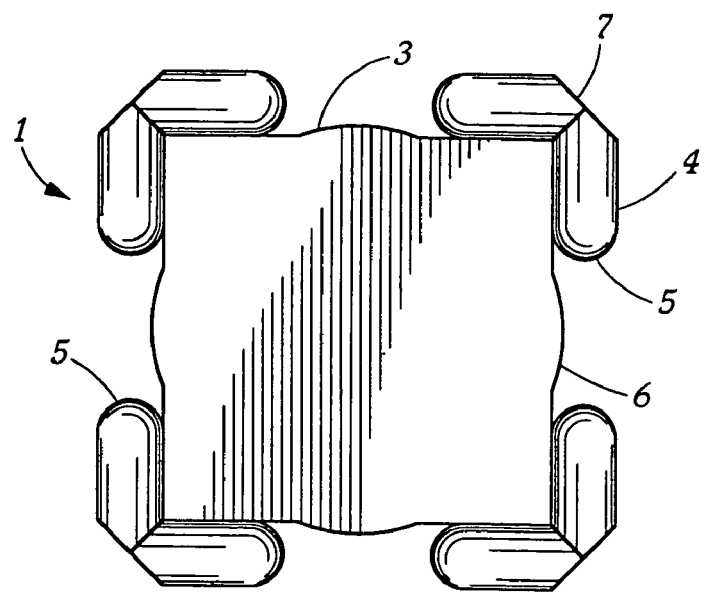
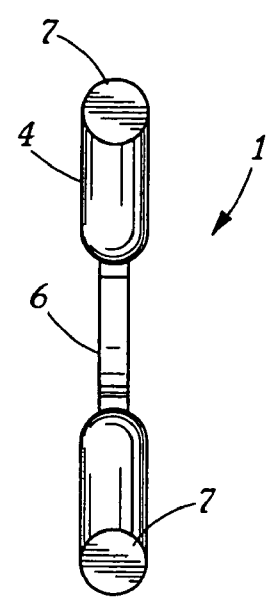
FIG. 1    FIG. 2
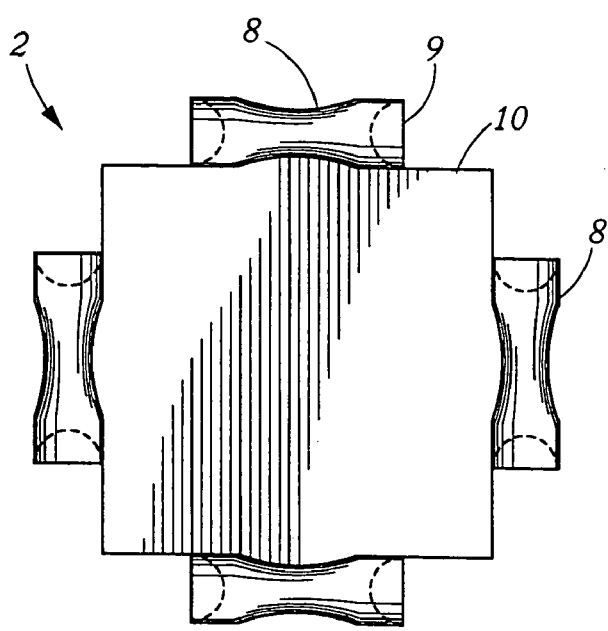
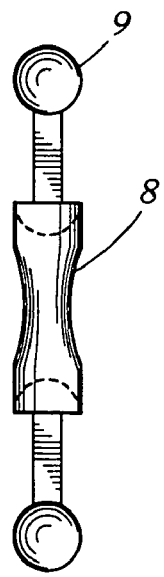
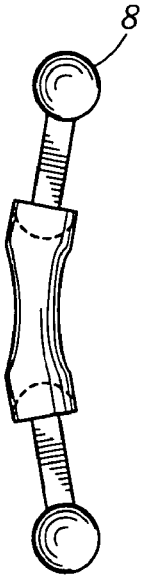
FIG. 3    FIG. 4a    FIG. 4b

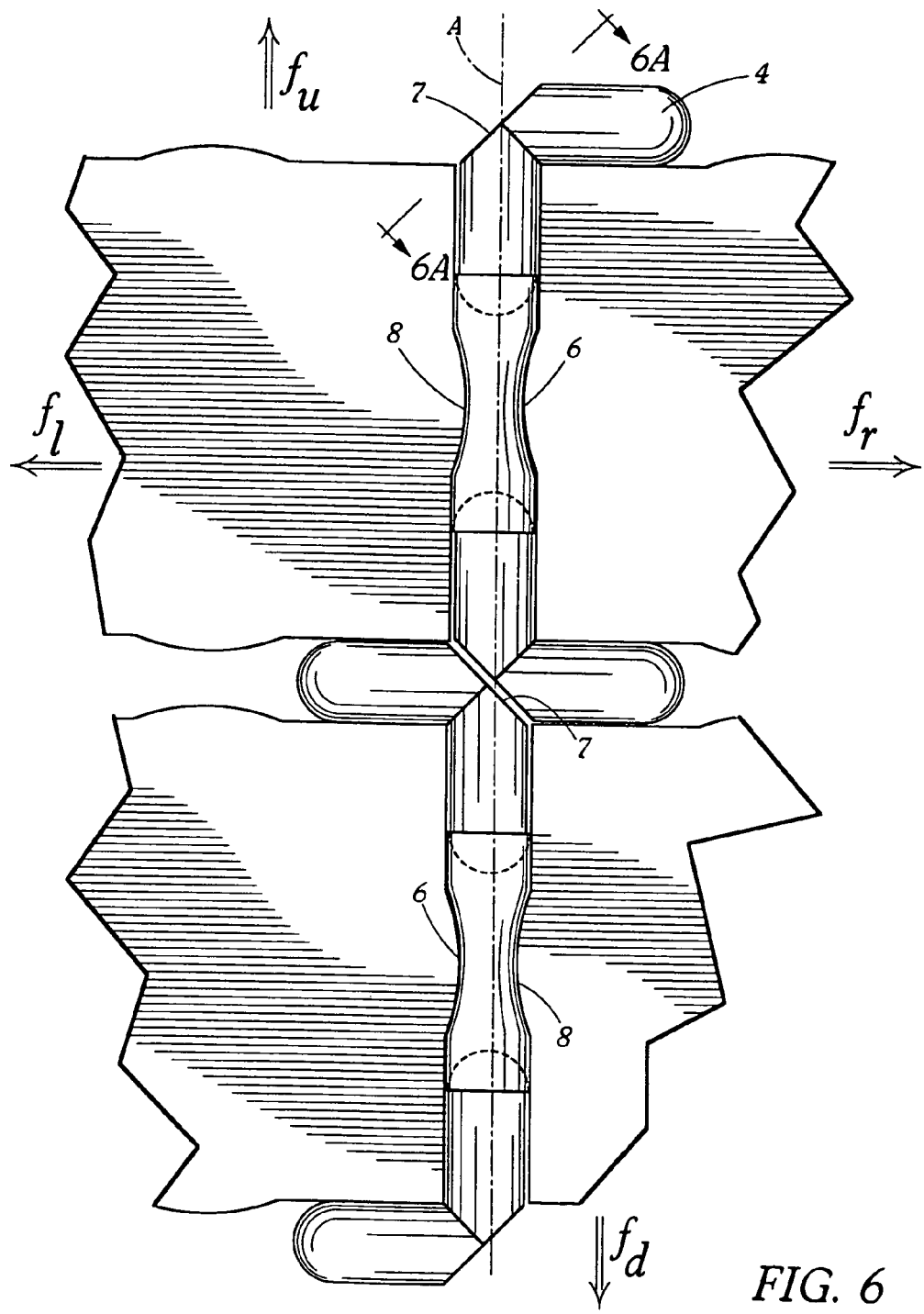
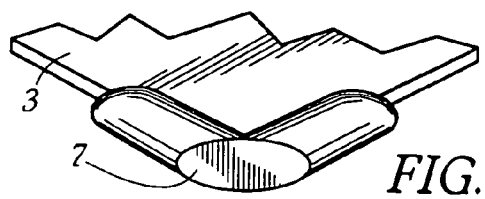
FIG. 6
FIG. 6A

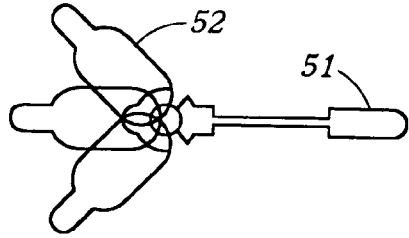
*FIG. 28*
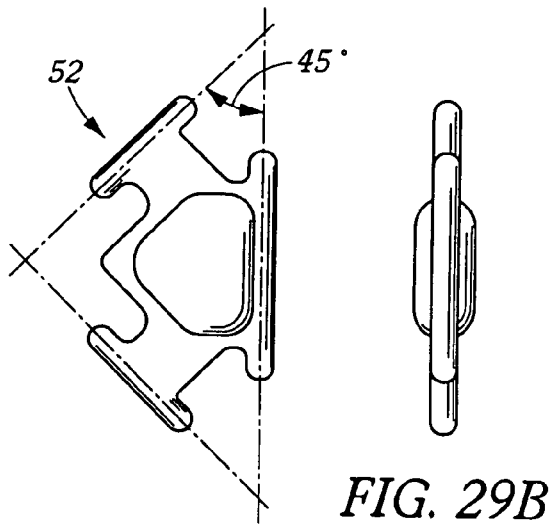
*FIG. 29A*
*FIG. 29B*
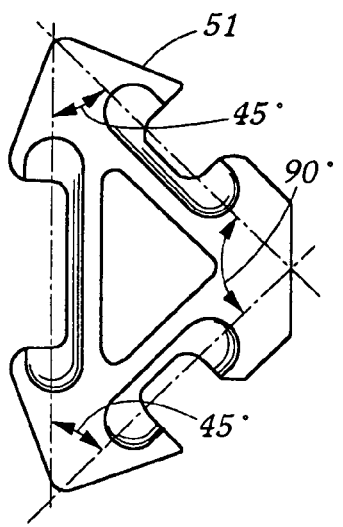
*FIG. 30A*
*FIG. 30B*
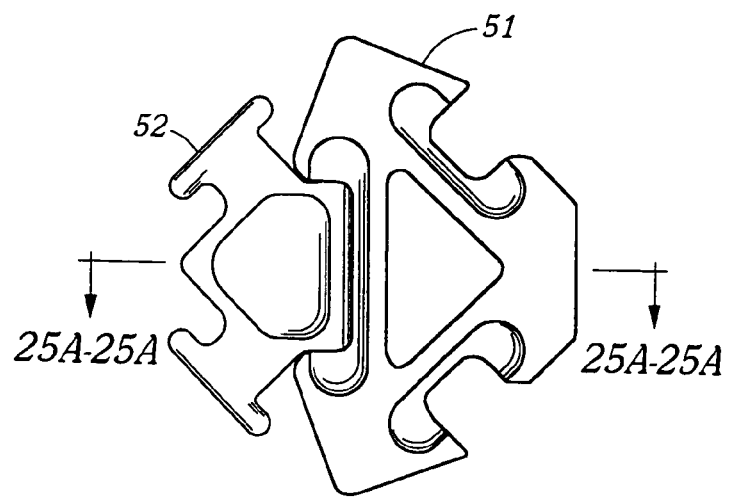
*FIG. 27*

CONNECTION ELEMENT STRUCTURE FOR A NON-TEXTILE FABRIC

RELATED APPLICATIONS

International Patent Application Serial No. PCT/US00/29948 filed 26 Oct. 2000 entitled "Direct Forming of Non-Textile Fabric Elements From Thermoplastic Pellets or the Like" is hereby incorporated by reference in its entirety.

FIELD OF THE INVENTION

This invention relates to the structure of the elements making up non-textile fabrics, preferably from forgeable materials, especially solid phase formable thermoplastics. Forgeable materials and solid phase formable thermoplastics are those that can be made to flow and conform to a mold when subjected to substantial mechanical forces at temperatures lower than the material's or thermoplastic's melting temperature. More particularly, the shapes proposed lend themselves to being formed in pre-determined arrays and interconnected to one another by forming adjacent elements directly onto each other. The elements also provide for 4-axis bending or rotating to allow for a natural fabric-like movement.

BACKGROUND OF THE INVENTION

It is unclear how some non-textile fabrics are formed into the desired two-dimensional or three-dimensional final shapes. In particular, it is unclear how the edges of the material are attached along seams in a manner that is economical, strong, and maintains the benefits of the non-textile fabric structure (such as cut and pierce resistance). One way to physically cut the two-dimensional fabric into the desired shape is by an industrial shear, laser, or other conventional industrial cutting process. However, it is believed that such a process would make it difficult, if not impossible, to then attach that cut edge to another piece of textile fabric in an economical way and maintain the benefits of the non-textile fabric. One such way to attach the rough-cut edges would be to use traditional zipper technology. However, while this allows separate pieces of non-textile fabric to be attached together, it does not provide a seam that maintains the benefits of the non-textile fabric.

In the application of the non-textile fabric to luggage, the use of a clamshell opening frame instead of a conventional zippered opening frame would avoid the security issues of using conventional zippers. However, neither of these methods takes advantage of the inherent characteristics of the non-textile fabric.

Further, when considering the attachment of the fabric materials along the seams, it is also important to consider the interconnection between elements not at the seams to insure that the seam does not fail at a significantly different load than the inter-plate connection. In known elements for non-textile fabrics, there are shapes or structures along the edges of the elements that mechanically interconnect with a corresponding or complementary shape of an adjacent element. Thus these interconnecting shapes hold adjacent elements to each other, and thus these connection shapes hold the overall fabric together. When a tensile force is applied to the assembled fabric, these shapes can distort in response to the stress.

For example, in the metal plate and ring type chain mail fabrics characterized Whiting & Davis bags and fashion items, such tensile stress tends to unclench the small metal hooks formed at the corners of the metal plates which engage the metal rings arrayed between the adjacent plates. In this example, the tensile force in fabric results in a bending force on the hooks. The mode of failure, when the tensile force in the fabric is exceeds a certain amount, is usually the straightening of the hooks, which thus slip out of engagement with the rings.

In the non-textile fabrics according to U.S. Pat. Nos. 5,853,863 and 5,906,873, the likely failure mode in this tensile overstress scenario is bending or stretching the rivet shaft to where the hooked edges of the plates slip past one another.

The barb and socket interconnecting plates described in the U.S. patent application incorporated by reference above, while less likely to fail prematurely because of yielding at the interconnecting shapes, will likely still fail when the socket portion spreads by bending, thus letting the barbed portion slip out.

In all of these cases, the interconnecting shapes tend to be the "weak link" in the system. Thus, the object of this invention is to strengthen the interconnecting shapes so as to delay or prevent premature disconnection of the adjacent elements when under normal to high tensile loads.

It is with these shortcomings in mind that the instant invention was developed.

SUMMARY OF THE INVENTION

The instant invention, as it relates to the attachment of two pieces of non-textile fabric (NTF) along a seam or between individual elements that make up the body of the non-textile fabric, is loosely based on the concept of a typical fabric zipper structure. Generally, in a typical fabric industry type zipper, the plastic or metal teeth avoid the bending mode of failure by backstopping or buttressing adjacent interconnected teeth with the next tooth on the connected zipper tape. When the zipper is closed, each interconnected tooth is prevented from bending out of engagement with the mating tooth in front of it because there is another mating tooth immediately behind it. Thus, the mode of failure of a closed zipper is rarely the bending of the teeth. Indeed, a massive tensile force at right angle to the length of the closed zipper would have to shear away the interengaging teeth to cause failure. This same concept can be adapted to non-textile fabrics to facilitate the connection of sections of these fabrics along seams, and also to connect the plate elements that make up the non-textile fabric.

In the instant invention, the connection structure having hinge knuckles, or more particularly hinge knuckles with pintles and corresponding receiving cavities can be used for both the connection structure for the plates in the field of an NTF, and can be used along the free edge of a portion of NTF to allow for easy attachment to the free edge of a separate portion of NTF having a complimentary connection structure formed thereon. When connected by interleaving the knuckles, the oppositely directed pintles on an edge of a plate are received in the oppositely facing cavities formed on an edge of an adjacent plate, and the pintles are held in the cavities by closely dimensioning the cavities to fit the pintles. This occurs during the type formation process set forth in the prior patent application incorporated herein by reference. In addition, the interface between plates along the line of connection between the pintles and cavities forms a generally solid structure with very little room for the pintles, cavities, or their support structure to flex away from one another to allow the pintles to disengage from the cavities. This creates the "back-stopped" or buttressed structure loosely based on a normal fabric zipper, and creates a terrifically strong connection that is likely to fail by shearing material before the connection structures disengage from one another by flexing or bending.

Accordingly, we have invented a non-textile fabric that comprises at least a first element type that has at least three sides. Each of these sides defines a connection structure for connecting to other such elements in the fabric. The inventive non-textile fabric also includes at least a second element having at least three sides, with each of these sides defining a connection structure as well. When assembled, the first and second elements are attached together in a repeating manner to form a non-textile fabric having at least three major bending axes. These connecting structures includes at least a knuckle that defines a pintle and has a second element that has a recess for receiving the pintle, whereby a hinge connection is formed between the connection structures of adjacent first and second elements.

Also contemplated herein is a non-textile fabric that comprises at least a first triangular shaped element that has generally three sides, each of these sides having a connection structure. The non-textile fabric has a second triangular shaped element having generally three sides, each of these having a complimentary connection structure. In this inventive non-textile fabric, at least the first and second elements are connected together to form a non-textile fabric having at least four major bending axes.

Further, the invention contemplates an element for forming a non-textile fabric such that when the non-textile fabric so formed generally lays in a plane when the fabric is flat, the inventive element has a general geometric shape that is in the plane of the non-textile fabric. This geometric shape is defined by at least three side edges, two of these side edges being adjacent to one another and these adjacent side edges forming an approximate right angle to one another. Each of these adjacent edges includes a connection structure for attaching that element to other elements to form the non-textile fabric. These connection structures include a means for hinging having an axis of rotation generally in the plane of the fabric.

Also contemplated in this invention is an element for forming a non-textile fabric as above, this element having at least three side edges, and the two adjacent side edges being formed at an angle to one another that is about 90°. The two adjacent edges include a means for engaging other similarly shaped elements to form the non-textile fabric and for forming a mechanical hinge with such similar connecting means carried by an adjacent element. Preferably, these mechanical hinge structures include hinge knuckle means. These hinge knuckle means have an end surface and the end surface has means for engaging an end surface of a similar hinge knuckle means on an adjacent element.

Further contemplated is a structure defining a seam for non-textile fabric. This seam comprises the first portion of non-textile fabric formed from an array of elements such that each element is connected by connection means to at least one adjacent element in the first portion of non-textile fabric. A series of elements in that portion of non-textile fabric have connection means that are not connected to adjacent elements within the first portion of non-textile fabric. There is another portion of non-textile fabric also made of elements that are connected together with adjacent elements. This portion of non-textile fabric also has a series of elements that are not connected that include a plurality of hinge knuckles and recesses on the knuckles. A line of connection is made between the first portion of non-textile fabric and the second portion of non-textile fabric that comprises interleaving hinge knuckles of the first portion and of the second portion of non-textile fabric whereby at least some of the pintles are captured in at least some of the recesses of those interleaved knuckles.

Also contemplated is a non-textile fabric comprising a plurality of first elements, each of these first elements having at least three sides and each side defining a connection structure, at least two of the three connection structures comprising at least one hinge knuckle and at least one gap. The non-textile fabric also includes a plurality of second elements, each having at least three sides with each of these sides defining a connection structure. At least two of these three connection structures comprise at least one hinge knuckle and at least one gap. The first and second elements have sides adjacent to and are hingedly attached to one another along those adjacent sides by interleaving knuckles and gaps on the adjacent edges of the first and second elements.

Other aspects, features, and details of the present invention can be more completely understood by reference to the following detailed description of a preferred embodiment, taken in conjunction with the drawings and from the appended claims.

BRIEF DESCRIPTION OF THE DRAWINGS

FIG. 1 is a plan view of a first element or plate for direct forming a non-textile fabric, said element including a first or male-type connection structure (knuckles with opposing inwardly facing pintles) portion for connecting to a second type of element.

FIG. 2 is a side view of the plate of FIG. 1, showing the relative thickness of the central, portion of the element compared to the connecting structures.

FIG. 3 is a plan view of a second element or plate for direct forming a non-textile fabric, said plate including a second or female-type connection structure (opposing outwardly-facing recesses in the ends of knuckles) portion for connecting to the first type of element.

FIG. 4a is a side view of the plate of FIG. 3, showing the relative thickness of the plate.

FIG. 4b is a side view of the plate of FIG. 3, similar to the view in FIG. 4a, except that the plate is shown flexing around the plate's laterally extending orthogonal axis.

FIG. 6 is an enlarged view of a typical connection structure of FIG. 5.

FIG. 6a is a view taken along the line 6a-6a of FIG. 6 showing a buttressing surface.

FIG. 27 shows linked pair of first and second elements.

FIG. 28 shows the range of motion of the pair of elements shown in FIG. 27.

FIGS. 29A and 29B show the plan view and edge view of another triangular shaped element.

FIGS. 30A and 30B show the plan view and edge view of another triangular shaped element.

DETAILED SPECIFICATION

Figure 5:
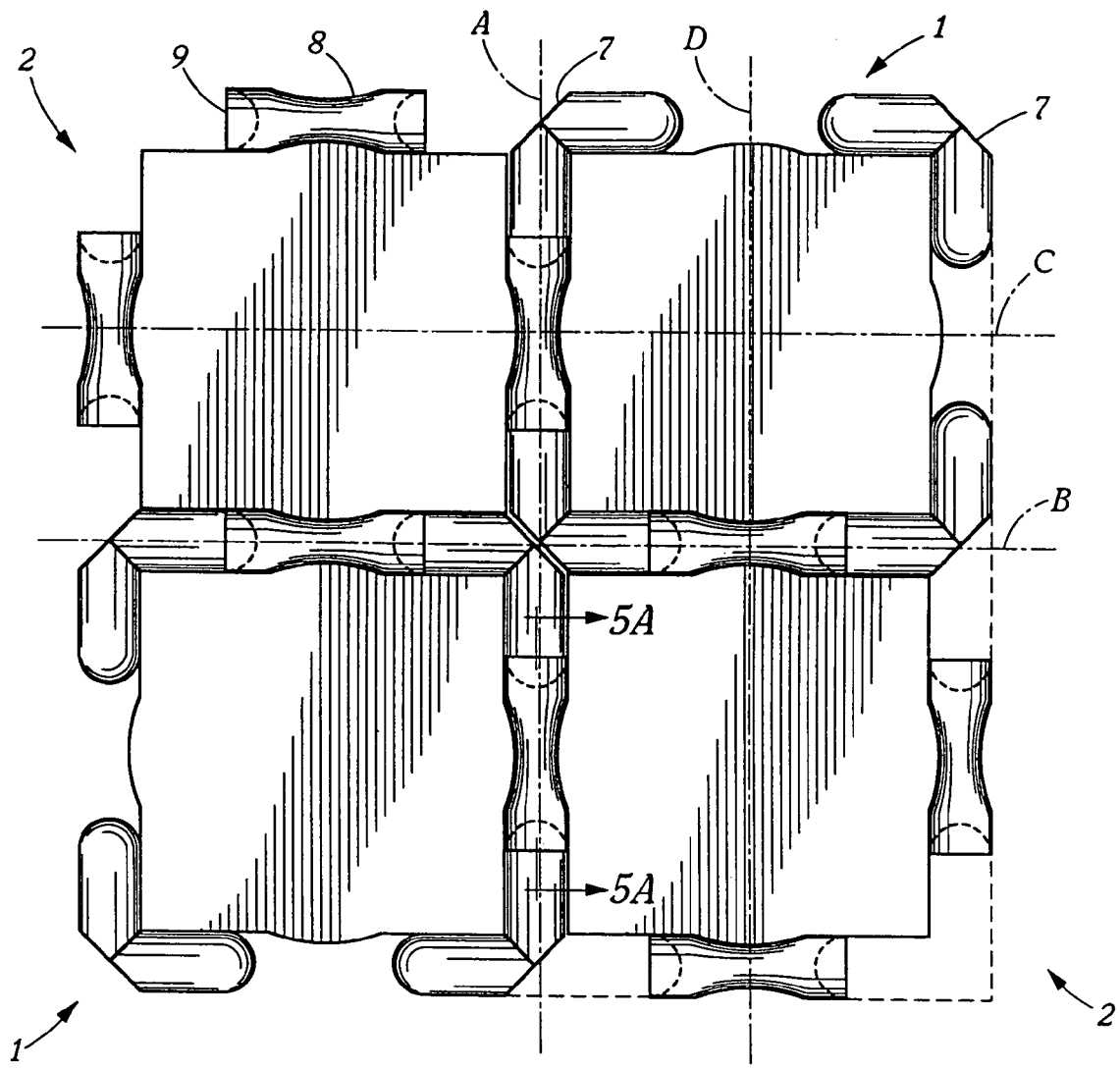
FIG. 5 is a plan view of four plates attached together with their connecting structures forming a series of interlocking rings, two of the plates being of the first type shown in FIG. 1, and two of the plates being of the second type shown in FIG. 3.

Referring to the Figures, the instant invention concerns the connection structure of plate-like elements 1, 2, 51, 52, 61, 62, 71, 72, 73, 74 used to make non-textile fabric sheets (FIG. 11, FIG. 16, etc.) used in several different applications, including luggage, automotive interiors, and other types of uses where the benefits of non-textile fabrics are desired. The connection structure 4, 8, etc., and associated method of making and using, is equally beneficial for use on every plate element used in making up an array of plate elements to form a non-textile fabric, and when used selectively along the edges of a section of non-textile fabric where that edge will be connected to another piece of non-textile fabric, and thus forms a seam between two pieces of non-textile fabric. In this description, each of these applications will be addressed separately.

Connection Structure for Use in Making Non-Textile Fabrics:

The basic structure and formation of NTF sheets in a direct forming process are described in the incorporated application. The instant invention sets forth another structural option for the connection structure, and is shown in FIGS. 1, 2, 3, 4a, 4b and 5 and elsewhere.

FIGS. 1 and 2 show a respective plan and side view of a first plate element 1 having a first portion of the inventive connection structure. The main body 3 is generally a thin, flat square plate. Other shapes, such as triangular, pentagonal, hexagonal, octagonal, or other polygonal shapes are contemplated. Each corner of the main body defines interconnecting shapes in the specific form of cylindrical hinge knuckles 4 molded at right angles (in the case of the square plate as shown) to each other. A small triangular portion having a face or facet 7 extending at a 45-degree angle to the two knuckles attaches the knuckles to one another. The entire shape is integrally molded to the corner during direct forming, and is thus connected to the thin web of the plate by smooth filleting or the like.

The ends of each knuckle terminate in a projection or pintle 5. The pintle can have any shape as long as it is relatively smooth and rounded, and allows release from the mold during the direct forming step. As used herein, a pintle is the protrusion, whatever the shape, that is formed on a connection structure, portion or knuckle, and connects to and is received by a complementary shaped cavity or recess of a second connection structure portion, as described below. Thus, each side of the first element or plate 1 includes a pair of such projections 4 on each edge, with the pintles 5 along each edge facing inwardly toward one another. An arcuate fin extension 6 is formed along each edge of the plate between the pair of knuckles, and is used to cover an area exposed by the interconnection of adjacent plates, as is explained in greater detail below.

FIGS. 3 and 4a and 4b show a respective plan and side views (straight and bent) of a second plate element 2 having a second portion of the inventive connection structure. As with the first plate, the main body is generally a thin, flat square plate 10. Other shapes, such as triangular, pentagonal, hexagonal, octagonal, or other polygonal shapes are contemplated.

The connection structure of this second element is generally a single, cylindrical, receiving knuckle 8 integrally molded to the center along each edge of the second element type or plate. The body of this knuckle narrows in a complimentary shape to the fin of the first element, which fin, as will be seen, engages this narrow portion to fill any openings formed by the attachment of the first and second plate elements. The ends of this knuckle each have a cavity or recess 9 that receives the corresponding pintle 5 of the first connecting portion or knuckle 4. The cavity or recess 9 of the second portion is shaped generally to closely receive, or match, the shape of the corresponding pintle. Most importantly, the inner diameter of the recess should closely match the outer diameter of the pintle, while the depth of the recess should be just equal to the free length of the pintle. The free length of the pintle is the length that is not connected to the edge of the plate. Also, the recess is generally cylindrical (that is has a surface shape generated by a line rotating about a central, fixed axis) to allow easy pivoting (actually, rotation about its own axis) of the pintle when received therein. Any other shape would inhibit the pivoting, which, however, in some cases may be desirable depending on the amount of relative movement desired between adjacent plates.

FIG. 5 shows four elements connected together using the inventive connection structures as described above. Given that there are two different but complimentary connection structure portions, two of the four plates are of the first type (that is, have the first connection structure portion), and two of the four plates are of the second type (that is, have the second portion of the connection structure). The engagement along adjacent edges of a top left and top right plates creates a hinge having a pivot or bending axis running through the center of the aligned series of knuckles and their pintles and the recesses. For instance, see line "A" running from top to bottom of FIG. 5. The two plates can move with respect to one another around the pivot hinge. This pivot axis A also extends through the attachment between adjacent edges of the bottom left and bottom right plates. Likewise, the plates can move with respect to one another around the pivot hinge (see axis B) running from left to right of FIG. 5, between the top left and bottom left, and top right and bottom right plates, respectively.

Figure 5A:
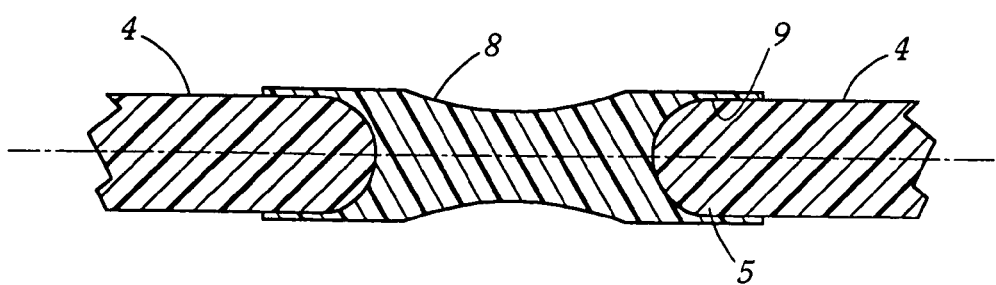
FIG. 5a is a section taken along line 5a-5a of FIG. 5.

In FIG. 5, the curved dashed line in the second connection portions along the connected edges represents the hidden pintles seated in the complimentarily shaped recesses. The pintles of the first connection portion fit within the complimentary cavities of the second connection portion, and are generally fixed in place except for their ability to pivot along the pivot axes as explained above. See cross sectional view, FIG. 5A. The first and second portions cannot easily be disengaged from one another since the pintles are inserted into the cavities, and would have to significantly deform the sidewalls of the cavities in order to be removed. When the two inwardly facing pintles are positioned in the two correspondingly outwardly facing recesses, the knuckle forming the recesses is effectively captured by and between the pintles.

FIG. 6 shows a close-up of the first and second connection portions of the vertically adjacent edges of FIG. 5 (along line A). This represents a portion of a matrix of plates interconnected together to form an NTF. The plates include the first connection structure portion (pintles) and the plates use the second connection structure portion (the recesses). The first and second connection portions, when connected together, form a solid structure with minimal or no gaps or spaces. This keeps the connection portions from flexing with respect to one another to prevent the pintles from pulling from the recesses. In greater detail, along line A for example, every pintle on connection portion or knuckle 4 is received in a recess of the connection portion 8 of the adjacent element, and the 45 degree angled facet 7 between the back ends of the knuckles 4 on one element engages the 45 degree angled facet portion 7 of the other element diagonally disposed therefrom. When a normal or extreme-use load is applied at right angles to line A (typically a tensile load in the plane of the NTF fabric, with for instance the left side having a pulling force to the left Fl, applied and the right side having an pulling force to the right Fr applied), the solid structure formed by the interconnection of the first and second connection structures does not allow the pintles to deflect laterally with respect to and disengage from the cavities. Where the load is increased significantly, the connection structure is likely to fail by the first and second connection structures pulling laterally apart, such as by the sidewalls of the recess 9 being ruptured or flexing to allow the pintle to escape.

Where the loads are placed along the line of connection, such as the forces Fu and Fd respective of line A, the connection structure form is a solid line of material, with the connection structure of one plate buttressing the connection structure of the adjacent in-line plate. The buttressing takes place not only at the engagement of the pintle 5 with the recess 9, but also at the 45 degree facet portions 7, which because in this example the connection structures are generally right circular cylindrical in this area are elliptically shaped (FIG. 6A). Where the load is increased significantly, the connection structure is likely to fail by the first and second connection structures failing in shear, as opposed to flexing and disengaging.

Figure 14:
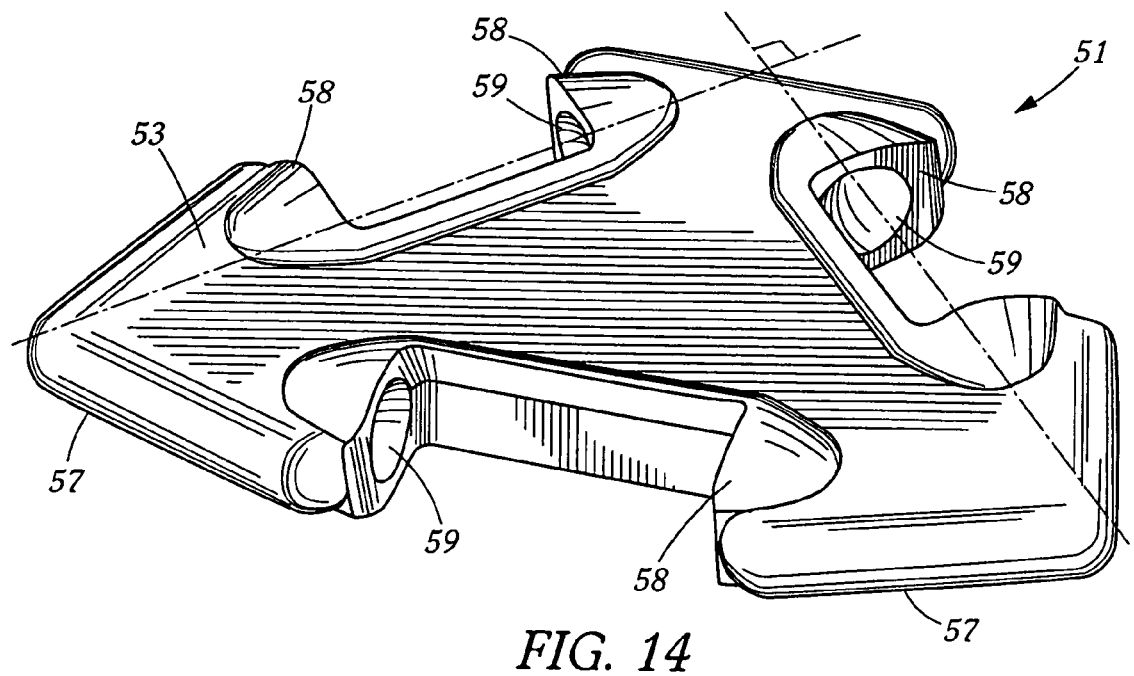
FIG. 14 shows a triangular embodiment of the first element for making the non-textile fabric according to the present invention.
Figure 15:
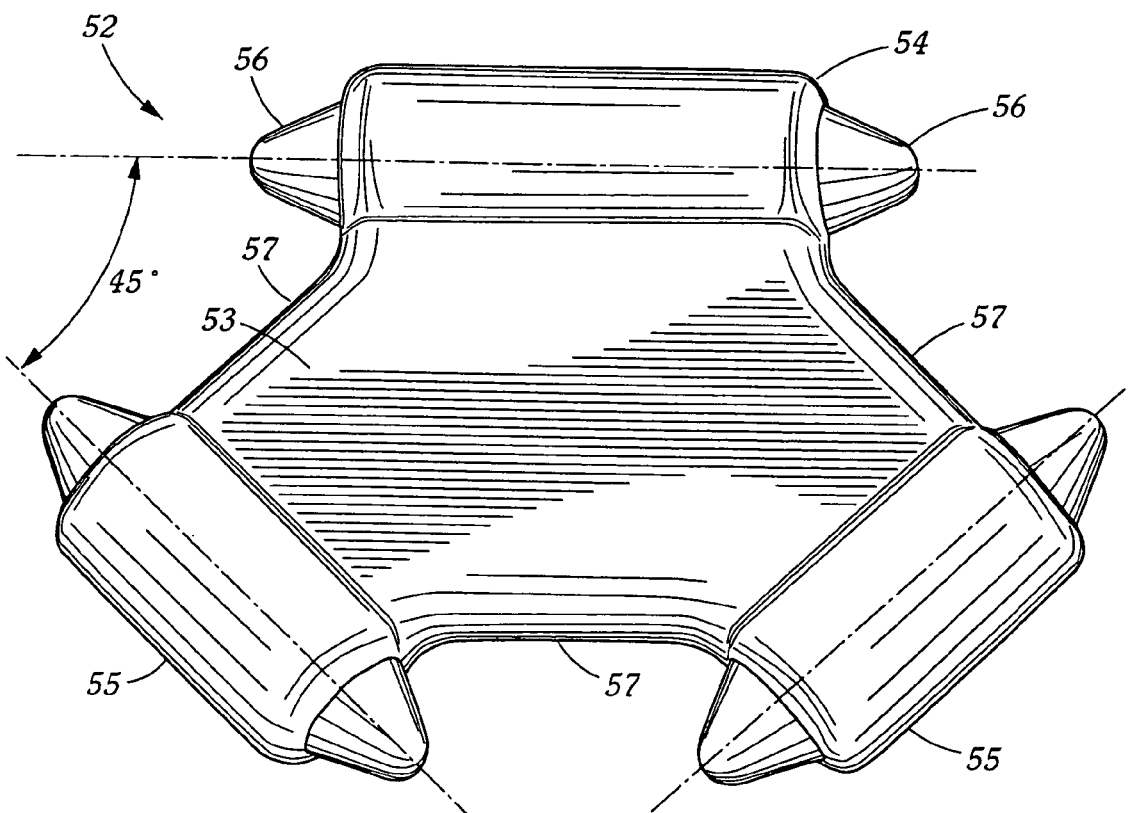
FIG. 15 shows the complementary triangular embodiment of the second element of the non-textile fabric according to the present invention.

The buttressing surfaces, formed by an angular surface 7 through the rear of the adjacent pintle cylinder, thus forming an ellipse as shown in FIG. 6a, could be replaced by other shaped surfaces, such as rounded edges 57 of the triangular elements 51 and 52 shown in FIGS. 14, 15, etc. This would simply require that each molded plate having the first connection structure have one of two buttressing surfaces formed during direct-forming to engage one another under the combination of forces Fr and Fl. As long as the buttressing edges replacing the 45 degree portion 7 act to engage one another and transmit buttressing forces to keep the pintle and cavities from flexing away and disengaging from one another, and can be formed by direct-forming, they are contemplated herein. Thus, this connection structure allows for a very strong NTF that has the desired flexibility along the hinge pivots.

Referring back to FIGS. 3, 4a and 4b, the second connection portion 8 defines a thinner waist that facilitates the plate bending and stretching across both orthogonal centerlines of the element 2. FIG. 4b shows the element 2 bending along its horizontal centerline. This allows these elements, when arrayed in a matrix with elements I and forming the NTF, to flex or twist to help absorb loads as needed while maintaining each pintle within its respective recess.

Referring to FIGS. 7, 8, 9 and 10, elements having a corrugation 11 running in one orthogonal direction are shown. The corrugation could run in the other or both of the orthogonal directions, or could be diagonal or some variation thereof. This shape serves to enhance the ability of the plate to stretch when the assembled non-textile fabric is subjected to tensile forces. This will have benefits to the overall structural integrity. The stretching that this structure allows is not significant enough to overcome the structural rigidity of the connection structure. The corrugation could also be a domed structure, a series of concentric ripples, or other such structure that allows some flexibility to enhance any natural resilience or stretching of the plate material. The corrugations (i.e., ripples, domed or other shaped portions) of the plate also help prevent such unseating by enhancing the otherwise minute stretching of the plate when the zipper-like joints between adjacent elements is stressed, either by tensile forces in the plane of the assembled non-textile fabric, or by bending forces along or at angles to the joints. This yielding will permit each element, especially elements similar to element 2, to increase its dimensions in the plane of that element. When assembled in any array, these slight yieldings result in many more elements sharing the tensile and/or bending forces throughout the NTF field, reducing stress concentrations in the NTF fabric, and thus enhancing the overall durability and toughness of these inventive non-textile fabrics.

Figure 7:
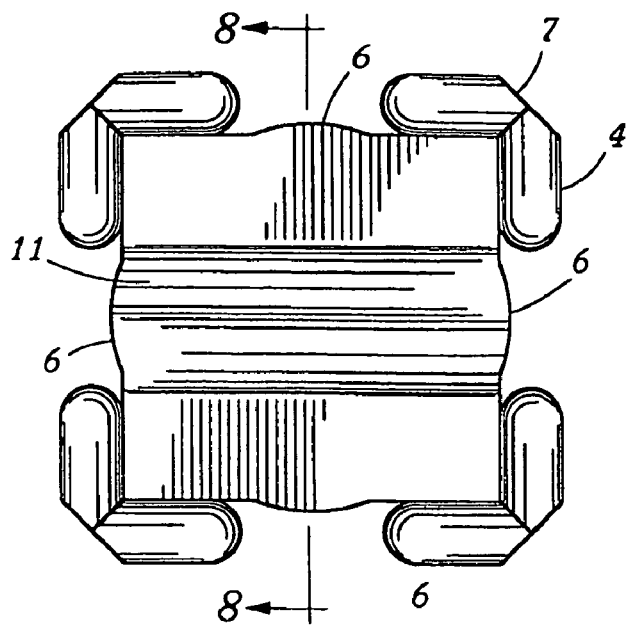
FIG. 7 is a plan view of an embodiment of the first element having a corrugated central section.
Figure 8:
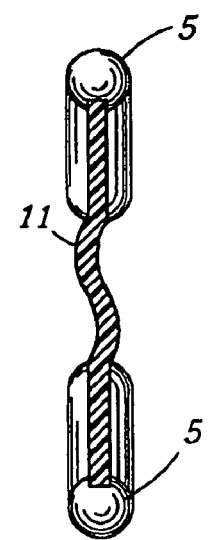
FIG. 8 is a section taken along line 8-8 of FIG. 7.
Figure 9:
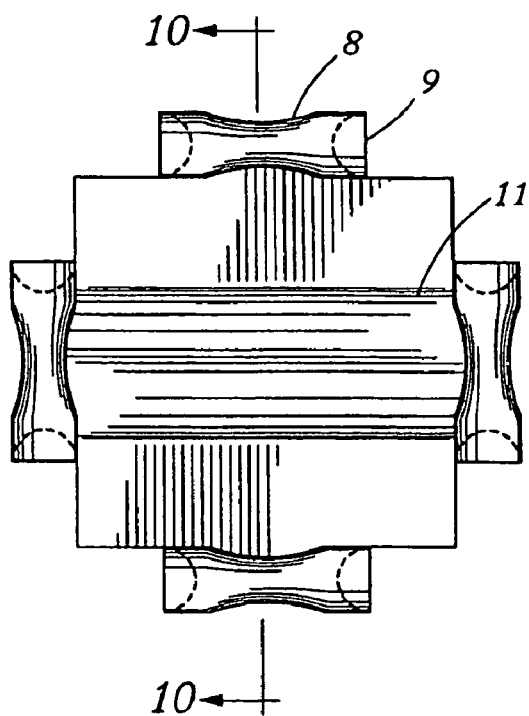
FIG. 9 is a plan view of an embodiment of the second element having a corrugated section.
Figure 10:
FIG. 10 is a section taken along line 10-10 of FIG. 9.

FIG. 7 shows a corrugation along one orthogonal line of the plate on the plate having the first connection structure portion. FIG. 8 shows a side view, and more particularly the bends of the corrugation. FIG. 9 shows a corrugation along one orthogonal line of the plate on the plate having the second connection structure portion. FIG. 10 shows a side view, and more particularly the bends of the corrugation. Note that the corrugations will increase the ability of the narrow waste portion of this second connection portion to flex and stretch.

This phenomenon will help assure the pintles captures within the cavities of the second connection portion will remain seated when the plate is subjected to high tensile and bending forces.

Note the synergy between connection elements or knuckles 4 and 8 and their carefully matched mating or complementary surfaces 5, 7 and 9 result in precisely linked portions of a ring-like structure surrounding relatively flat plates 3 and 10.

Connection Structure for Use at a Seam

This special pintle and recess connection structure can also specifically be used on an outer edge of a sheet of NTF to allow that sheet to be attached directly to another sheet of NTF having a correspondingly formed outer edge. In this scenario, the precise structures used to connect the plates making up the NTF are immaterial. For instance, the barb and socket structure could be used to connect the plates within the NTF (see the application incorporated by reference for a description of this structure), and the pintle and recess structure can be used at the outer edge to connect two sheets of NTF together. Because the pintle and recess structure, when not connected together, does not have the solid and non-flexing characteristic such as when they are connected together, the two connection structure portions can be connected by hand or by post-forming, and do not have to be connected together during the direct forming process.

The outside edges of the sheet 20 (FIG. 11) being direct-formed must be designed in the direct forming process to create the first and second connection portions alternatingly along the outside edge. That outside edge can then be attached to another sheet of NTF that has a corresponding outer edge with the complementary, alternating pintle and recess structure. This is called "zipping" the sheets together. Once zipped together, the zippered edges have the strength and performance discussed above.

Other edge structures can be used to form "zipped" closures between two free edges of NTFs. An extension of the forming and assembly process outlined above, any opening in the NTF shapes, or seams between shapes could be made to be zipped together as outlined above. Such zippered openings would require neither conventional textile tapes nor separate assembly of the zipper tracks to the NTF. This process involves using the thus formed free plate edges with their connecting structures exposed (in the case of a zippered opening between shapes) or a continuous line of unset rivets (if the plate and rivet scheme of the prior art is used) to form the teeth of the zipper. This could be accomplished in at least two ways.

Figure 11:
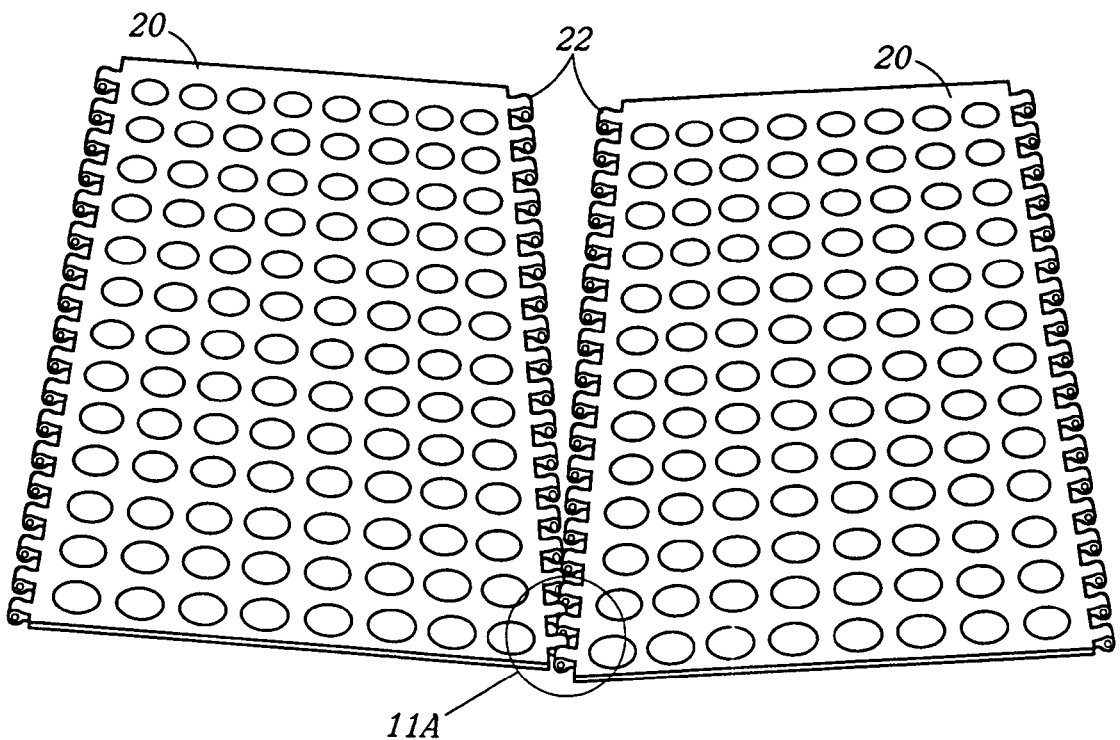
FIG. 11 is a perspective representative view of a seam structure along the free edges of two portions of non-textile fabric allowing them to be relatively seamlessly attached together.
Figure 11A:
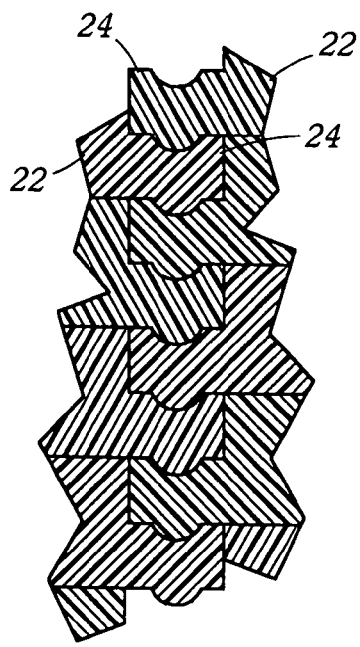
FIG. 11a is a close-up representative section view of the interengagement of the connection structures along the free edges of FIG. 11.

Zipper-toothed plates could be used throughout the field to make up the entire NTF as discussed above. In this scenario, the plates 22 would be formed with the ends already having appropriate zipper-toothed shapes 24 (FIG. 11A). When these shapes are overlapped and held in place by rivets, the teeth act as in the original disclosed in the above incorporated application—permitting "stretching" as the slop in the links are taken up or pushed together, twisting and the like. However, along unriveted edges, an appropriately shaped slider, as in a conventional zipper, can bring the toothed shapes together. This would allow the free edge of two NTF sheets to be attached together. These zippered tooth connection structures could be produced during the direct forming process.

Alternatively, a special, zipper toothed plates could be used only at the free edge if it was desired to use a different connection structure for connecting the plates in the body of the NTF sheet. Here, instead of perhaps compromising the best shape for the plates to provide zipper teeth on all plates, special plates having one appropriately toothed arm are used only along the edges to be zipped. This would require placing these special zipper elements or plates along only the edges at some point of the assembly process, preferably formed in place using the process of the incorporated patent application.

Alternatively, This could be done when arraying the elements to form the web or sheet, or this could be done after the shapes have been picked. If the special zipper elements 22 were placed in the web, it would require segregating and precisely placing, steps that may unduly complicate this initial forming operation. If done after the shapes are picked, the riveting of the special plates could use technology directly from the toothed zipper industry. The toothed plates would be moved from a supply, oriented, positioned along the shape edge, and riveted or forged in place. The zipper-toothed edge 24 could also be formed in a particular column of the roller matrix of molds, as described in the application incorporated by reference. This would allow automatic formation of the zipper edge at the desired edge location. It would be important to make sure that the zippered tooth edge is the desired free edge of the sheet of NTF. The resulting integrally formed zipper might look as shown in FIG. 11 and 11a. Here a series of connection structures or knuckles 24 are shown with each having oppositely facing pintles and recesses. When the knuckles are interleaved together, the pintles and recesses receive one another, and the next knuckle in line buttresses the next to form a remarkable strong joint between NTF portions. While FIG. 11A shows a series of identical knuckles, it should be understood that every other knuckle could be a male or first connecting element and every other one could be female or connecting element of the second type, just so the interleaved knuckles form a series of interfitting connections. As detailed above, these interfitting knuckles themselves form a hinge connection between the thus seamed together NTF portions. In theory, a product assembled in this way from two-dimensional NTF elements would have no seams. The juxtaposed edges could be made undetectable and as strong as any other portion of NTF in the final three-dimensional NTF shape.

In manufacturing a NTF using the direct forming process described in the above application herein incorporated by reference, the pintle and recess connection structure described herein would be used to form the entire sheet, but could be used just along one edge of the sheet for zippering to or seaming with another sheet. The second element type (defining the knuckle having the outwardly facing cavities on each edge) is formed in the next direct forming step. In forming the second element type, the cavities are formed using the pintles as part of the mold cavity, similar to how the barbed end and socket attachment structure embodiment is formed (see FIGS. 12 and 13).

In more detail, the pintle structure 4 is formed with the elements in the first direct forming step. Then, the mold cavity 40 for the second forming step, which forms the second element with the knuckle having the outwardly facing recesses on each end to receive the pintles, includes not only outer walls but also inner walls defined by the pintle ends to define the cavity. See FIG. 12. During the second forming step, the pellet is direct formed into the mold cavity and takes the shape of the mold cavity 40 (around the pintles' ends). See FIG. 13. At this stage, the first and second elements are thus interengaged by the direct forming process and are ready to be further processed into the final product.

Figure 12:
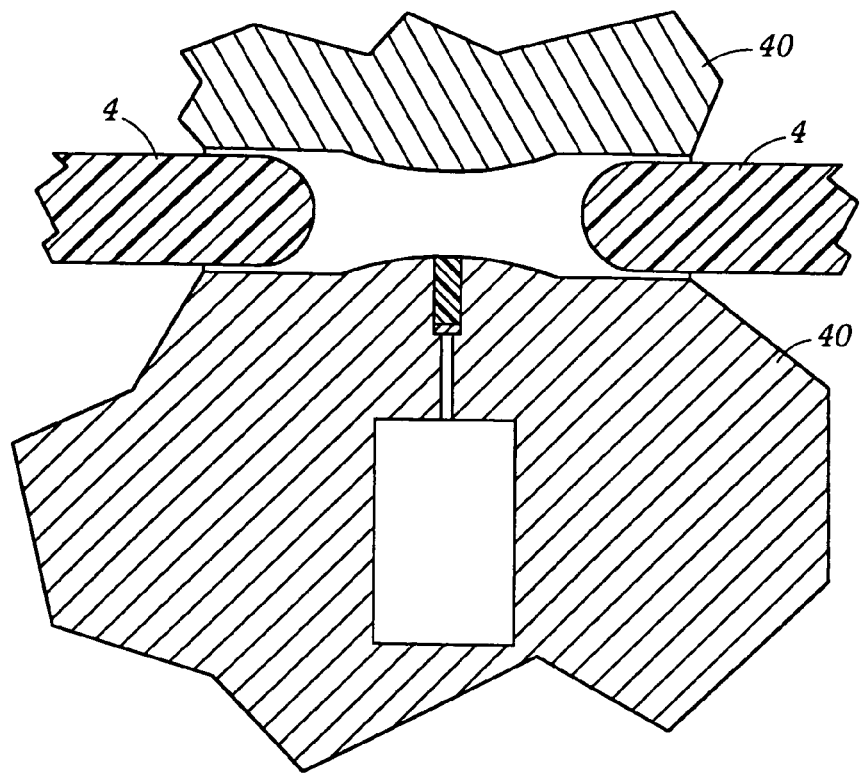
FIG. 12 is a representative section view of the mold cavity for direct forming the second plate or element with a connection structure having opposing outwardly facing cavities, prior to the direct forming step.
Figure 13:
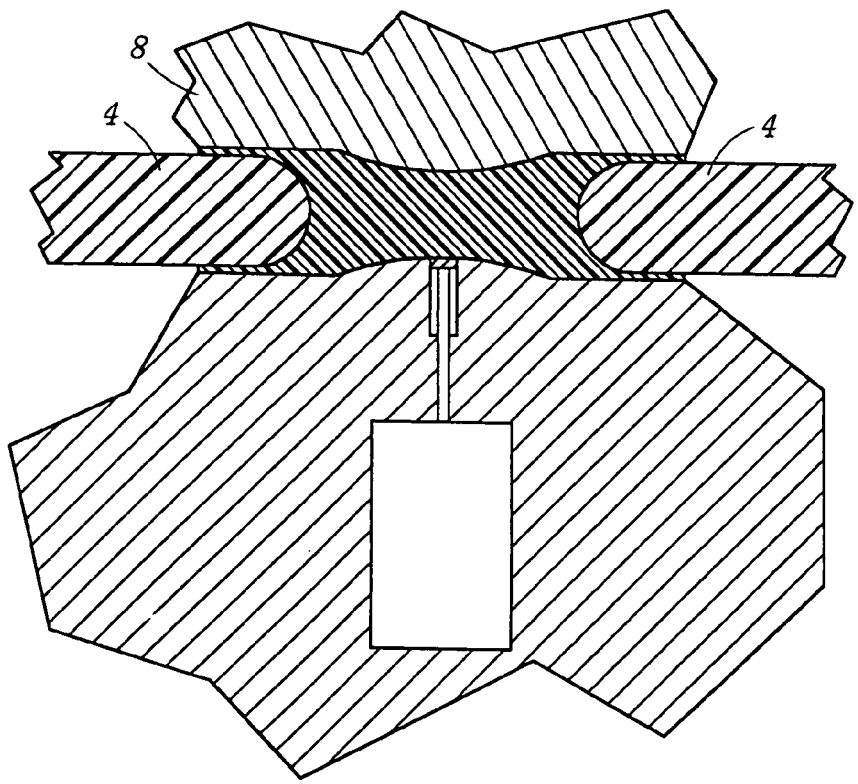
FIG. 13 is a representative view similar to FIG. 12 after the direct forming step.

In forming the recess around the pintle, the amount the sidewall extends along the pintle is shown in FIGS. 12 and 13 to be over half the length of the pintle. However, what is important is that the pintle is positioned in the recess so that it has an adequate bearing surface for pivoting therein, and also that the sidewalls extend sufficiently along the pintle to keep it from slipping or flexing sideways out of the recess. It is contemplated that the sidewall of the recess could extend generally only ¼ of the length along the pintle, or more, and satisfy these requirements. Of course this depends on the shape of the pintle, because if the pintle has a generally larger radius of curvature the sidewalls would need to extend further along the pintle, and if the pintle had a generally smaller radius of curvature the sidewalls could extend less of a distance along the pintle.

Where the pintle and recess structure are formed only along the free edge of the NTF to facilitate connection to the free edge of another NTF portion that has the same connection structure, the elements that have the cavities on the outer edge must be formed using a mold cavity that already defines the pintles therein. In other words, the free edge of an NTF portion does not have an adjacent plate that has the pintles to use as part of the mold cavity (as are present in the general field array of the NTF, described above). In this instance, the pintle portion of the mold cavity, since there are re-entrant mold portions, should have a larger radius of curvature and minimal extension of the recess sidewall along the length of the pintle. This will allow the recess to be formed in the knuckle and, since the material is a polymer with some flexibility and resilience, the pintle portion of the mold cavity can be extracted from the formed cavity by flexing a sidewall and exiting the cavity, preferably without ruining the recess structure. The NTF having this free edge defining the pintle and recess connection structure can then be engaged with (zippered to) the free edge of another portion of NTF having a corresponding pintle and recess connection structure to create the desired shape.

The non-textile fabric (NTF) of the present invention, and as generally and specifically shown in FIGS. 16-33, is made up of interconnected elements. Specific reference to a particular figure is made only where it is believed that such reference is more helpful than a study of each of the references in light of the description.

As stated before, preferably there are two elements, a first element and a second element, which are interconnected in a repeating pattern to form the NTF. The two elements each have a shape such that when interconnected four primary bending axes are formed. By primary bending axis is meant a bending or hinging axis between NTF elements that is not parallel to another primary bending axis. In point of fact, a properly executed NTF panel has many bending axes, since as contemplated each element can hinge relative to its adjacent element, and elements having aligned connection structures can themselves move in concert about those aligned structures with other elements. If an NTF had only a single primary bending axis, one could at most roll the NTF into a spiral or cylinder. Two primary bending axes could permit one to flex an NTF into one or the other of two orthogonal cylinder or spiral shapes. An NTF having three primary bending axes permits three different cylindrical orientations. These greater bending freedoms, when combined with expected dimensional tolerances when forming the elements to one another, give remarkable bending flexibility. This allows the plurality of elements to pivot or rotate with respect to each of the adjacent elements in such a way as to allow the NTF to have a natural drape-like fabric or leather, yet since the elements are made of relatively hard plastic (or the like) the NTF is also tough and abrasion resistant.

This three axes flexibility is best achieved by elements having overall triangular shapes, as will be detailed below with reference to FIGS. 14 on. Each element 51, 52, etc., has a body 53 that forms a right isosceles triangle (a triangle having two sides of equal length with a right angle formed therebetween). The tip of the triangle at the intersection of the equal-length sides is truncated (to butt up against a similarly truncated tip of another larger element when interconnected).

Each of the sides of the first element defines a connection structure 58 to receive a corresponding connection structure 56 formed on the edge of the second element 52. A boss or knuckle 58 is formed at each end of each of the two equal length sides of the first element. Recesses 59, generally cylindrical, are formed in each boss 58, with the recesses opening inwardly along the side to a gap formed between the knuckles.

On the longer side of the first element, a connection structure is formed that is centered on the midpoint of the length of the side. This connection structure is longer than the connection structure on the two equal length sides. Two bosses or knuckles 58 are formed, preferably equally spaced on either side of the midpoint. A recess 59, generally cylindrical in shape, is formed in each boss. The opening of each recess is directed inwardly toward an open gap formed between the recesses. The recessed connection structures formed on the edges of the larger elements can be referred to as a female-type connector element, and form a means for connecting to the second element. The recesses can also have other shapes conducive to a bending or rotating (about an axis) engagement with the connection structure on the second element received in the recesses. For instance, the recesses could have a conical shape, with the recess tapering from a large diameter (and potentially very thin boss wall) at the opening to a smaller diameter (and much thicker boss wall). The connection structure on the second element must of course then be structured to work with the specific shape of the recess.

Each element is relatively rigid and relatively planar, with the three side edges bearing the connections structures ringing a relatively flat central portion. The bosses of the connection structure on the first element preferably extend above and below the plane of the main body, and thus helps deflect the wear and tear during use, from the main body. Alternatively, the main body can include an upstanding boss or protrusion (for example see FIGS. 29A and 29B) which can preferentially absorb the wear and tear to which the NTF is subjected.

The second element 52 is also generally triangular in shape with connection structures 54 and 55 formed along each of it sides. See FIG. 15, etc. This second element is also generally a right isosceles triangle. The connection structure along each edge is basically a cylindrical knuckle with a central post or pintle 56 formed on each end, and each knuckle connected to the central relatively flat plate 53.

On the equal length edges of the second element, the connection structure 55 is preferably offset toward the non-intersecting ends. The extending portion of each of the knuckles near the intersection of the equal length sides do not intersect one another, but actually form a gap so that the apex (intersection) fits closely with the butted ends of the truncated points on the first elements when attached together. These connection structures are at 90 degrees to one another, and are each at about 45 degrees to connection structure 54. See FIGS. 17 through 22.

The connection structure 54 is also attached to the main body along its length. The connection structure has a post or pintle 56 that extends beyond either end of the knuckle. The pintle must have the appropriate length and outer shape to be received in the corresponding recess on the first element 51 in a rotational manner. As the recess is formed directly against the pintle shape in the preferred manufacturing process, this precision is easily accomplished.

If the elements are not formed in a direct forming process, care must be taken to insure that the pintles on the second elements fit appropriately in the recesses of the first elements (or, more generally that the connection means on the second elements fit rotatably in the connection means on the first elements). For instance, if the post is conical, the recess should be conical.

Figure 23:
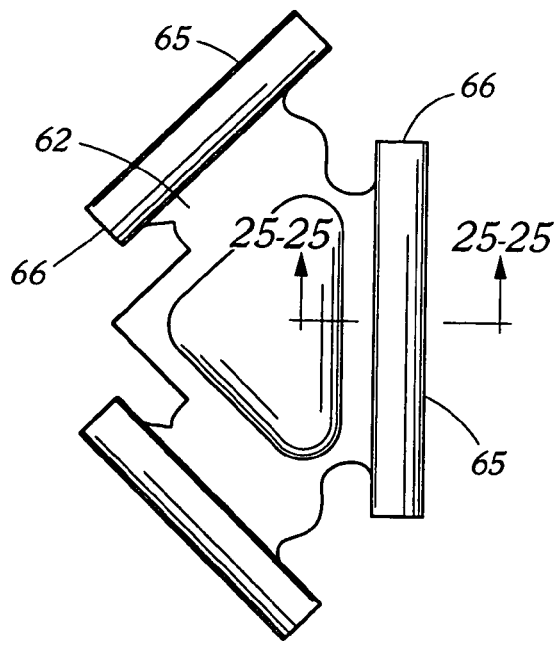
FIG. 23 is a top view of an element having cylindrical male connector portions that covers relatively less area in the plane of the non-textile fabric.
Figure 25:
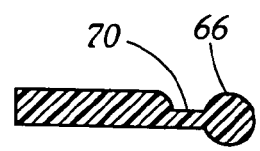
FIG. 25 is a section through I-I of FIG. 23, and shows the living hinge at the base of the connector portions to allow additional bending at extreme angles.

As shown in FIG. 23 and 25, the attachment between the body portion 53 of the elements and the connection structures 54 and 58 can be formed in a thin web 70 that can form a living hinge using well-known techniques, in order to provide an additional measure of flexibility. The living hinge would flex when the relative rotation of the posts in the recesses is stopped by mechanical interference between the connection structures. The living hinge would then flex or bend along the blocked connection structures to provide stress relief and an extra measure of flexibility along the bending axes. The second element 52 may also include a thickened central portion of the main body. Where the elements are formed by a direct forming process as described herein and the second element is smaller than the first element, the thicker portion allows the same volume feedstock to be used for the formation of both the first and second elements. In other words, since the second element is smaller in plan than the first element, and the same volume (size) feedstock pellet is used for each sized element, the thick central region allows for the extra material to be used up.

The connection structures on the equal length sides of the first element 51 are at right angles or ninety degrees to each other. The connection structures 58 on the longer side of the first element are at a 45-degree angle to the connection structures on the equal length sides. The connection structures on the equal length sides of the second element are at right angles to each other. The connection structure on the longer side of the second element is at a 45-degree angle to the connection structure on the equal length sides.

Figure 16:
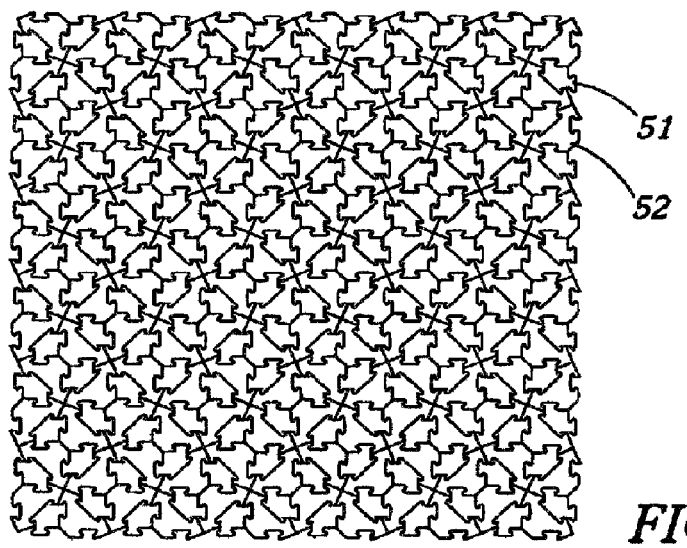
FIG. 16 is a plan view in a small scale of an array or non-textile fabric of interconnected elements according to the present invention.
Figure 17:
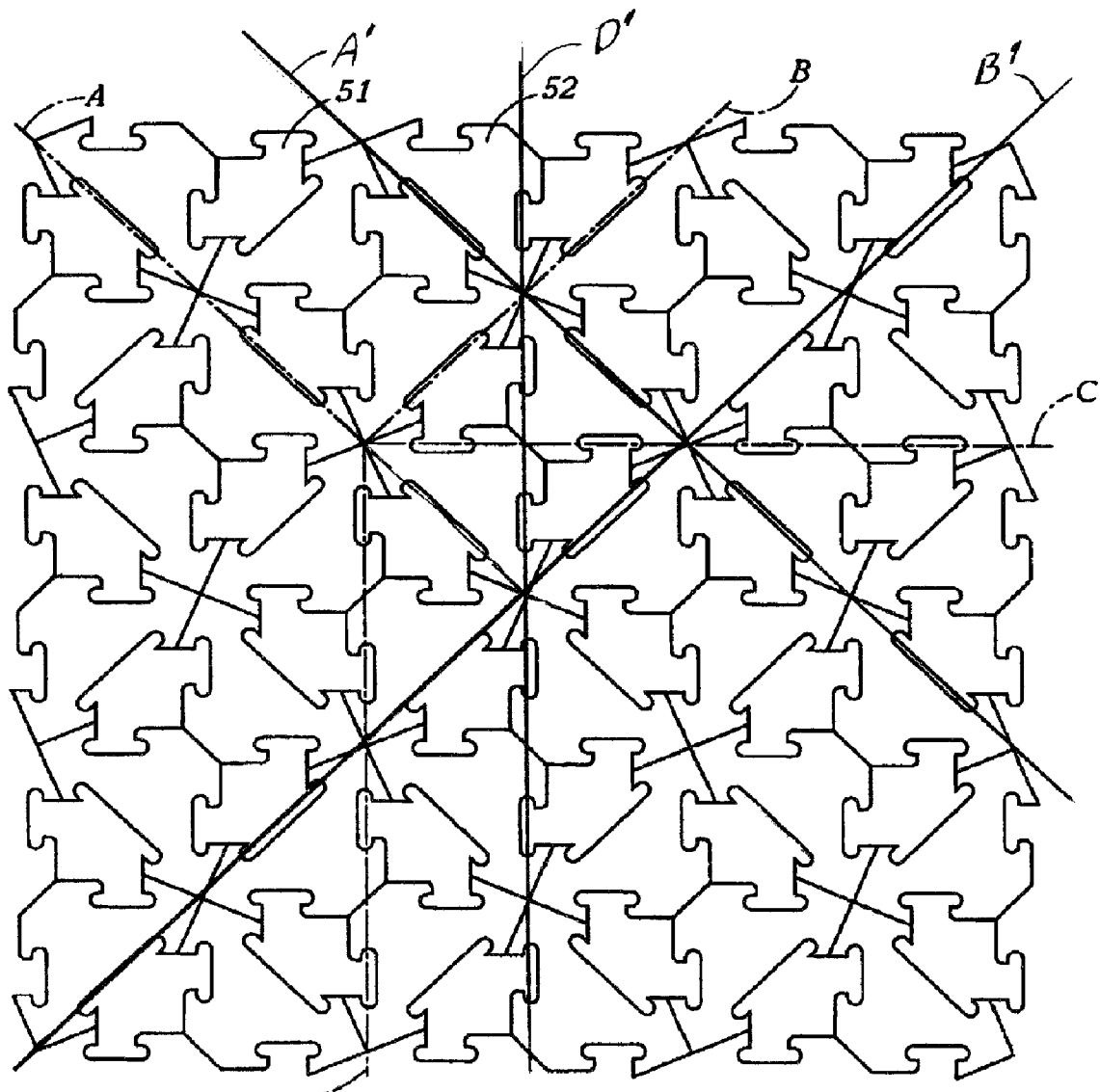
FIG. 17 shows the array of interconnected elements of the present invention in a larger scale.
Figure 18:
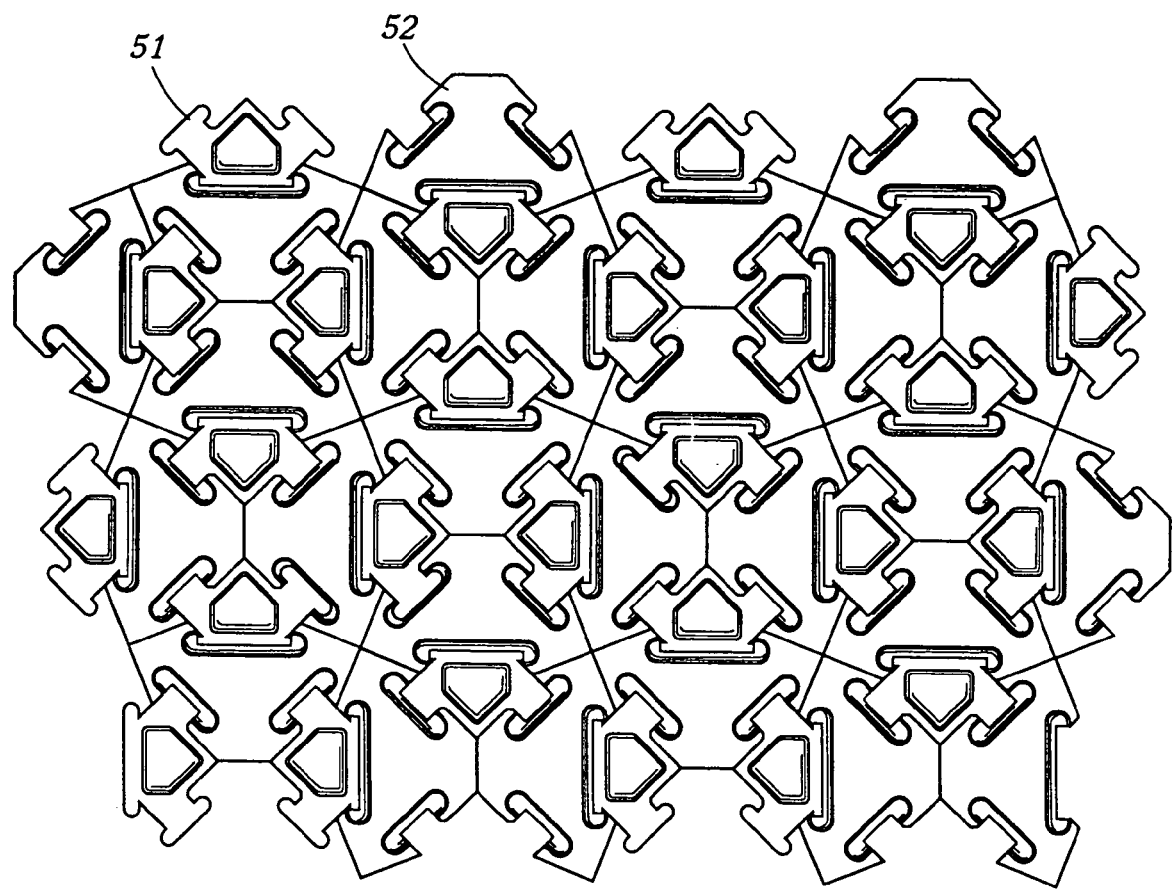
FIG. 18 shows a non-textile fabric made of the elements of the present invention, showing the non-textile fabric in a planar configuration.
Figure 19:
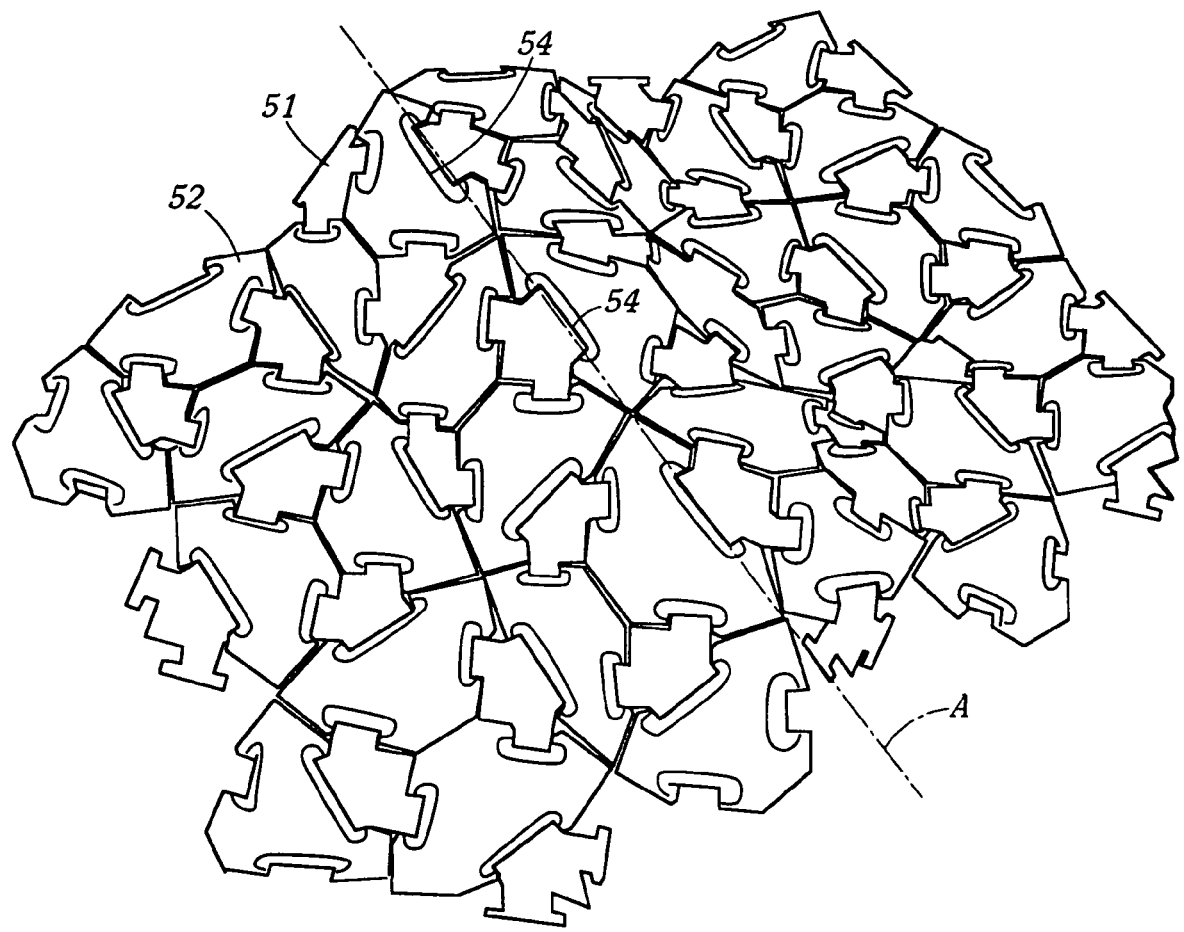
FIG. 19 shows a non-textile fabric made of the elements of the present invention, showing the non-textile fabric draped along a longitudinal bending axis "A".
Figure 20:
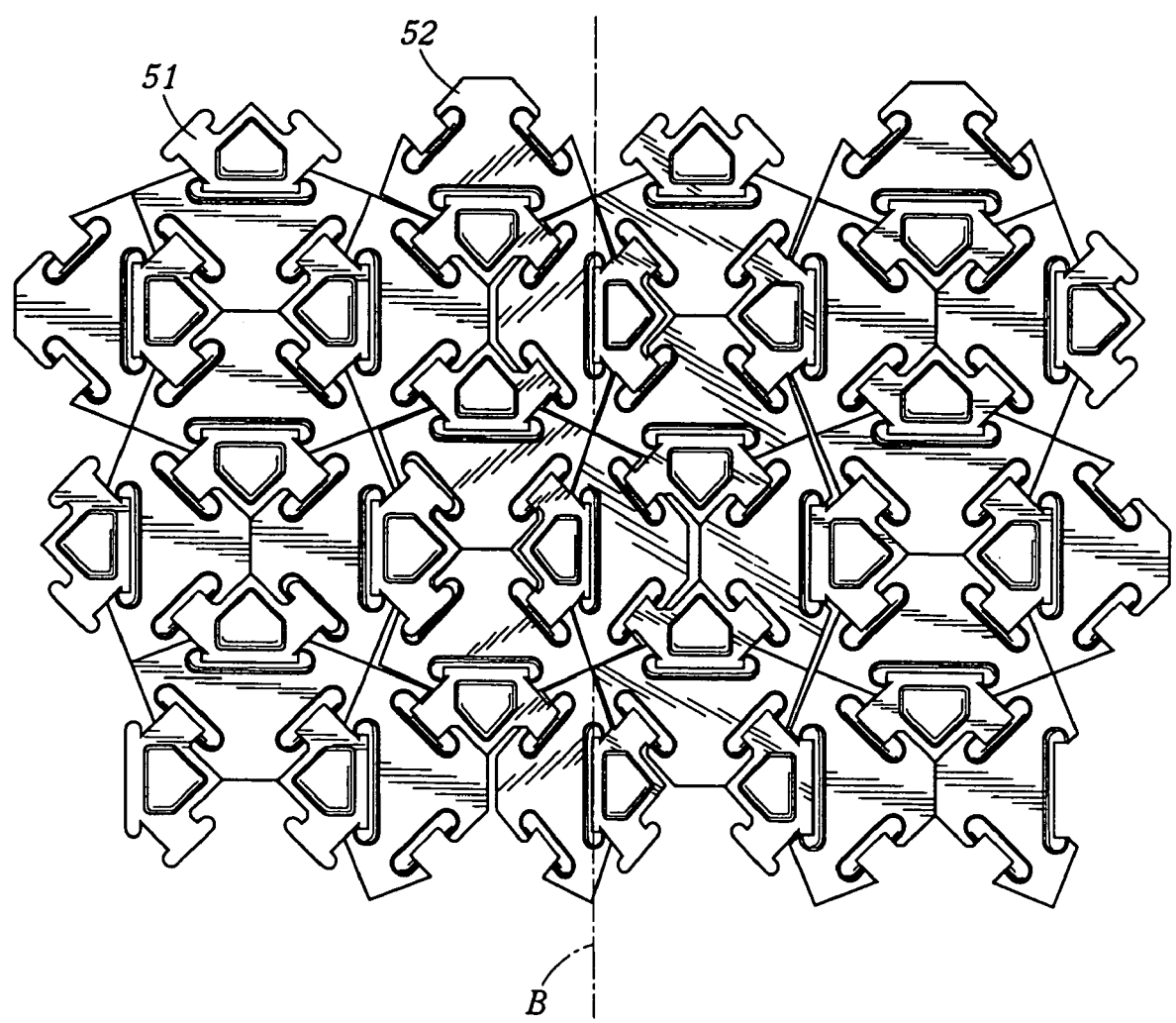
FIGS. 20 shows the non-textile fabric draped along a second longitudinal bending axis
Figure 21:
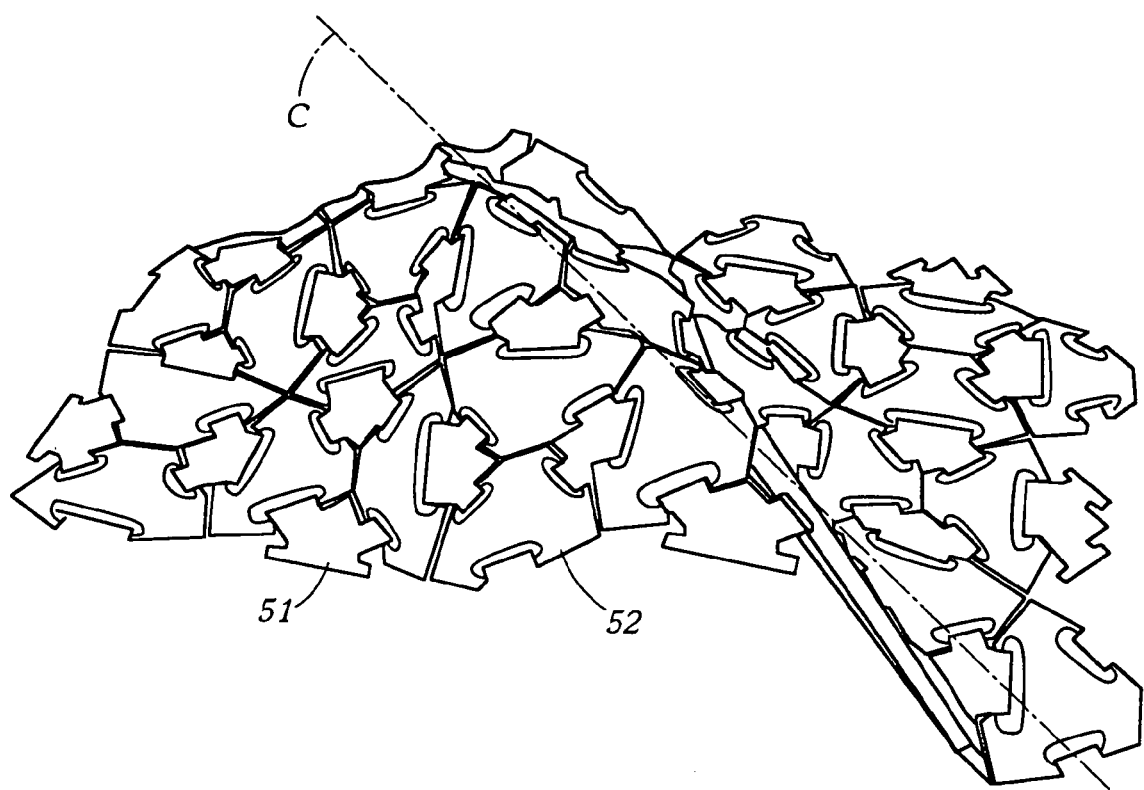
FIGS. 21 shows a non-textile fabric made of the elements of the present invention, showing the non-textile fabric draped along a first diagonal bending axis "C".
Figure 22:
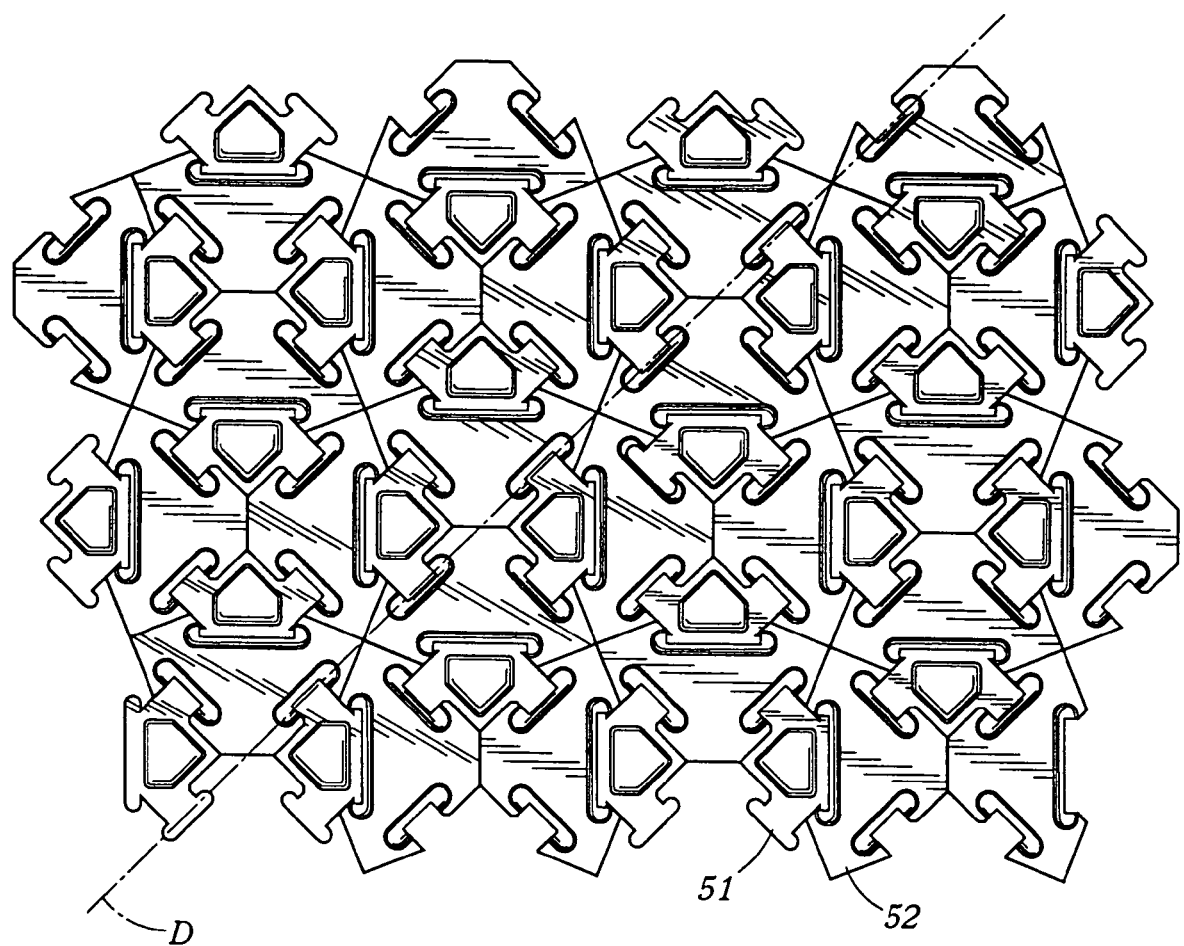
FIG. 22 shows a non-textile fabric made of the elements of the present invention, showing the non-textile fabric draped along a second diagonal bending axis "D".

FIGS. 16, 17 and 18 show the elements interconnected together to form the NTF. FIG. 17 shows the major bending axes A, B, C, and D. Note that, consistent with the definition of major bending axes, none of A, B, C, and D are parallel to the each other. Each of these major bending axes represent a whole series of parallel bending axes that occur throughout the NTF, each corresponding to every alignment of connection structures. FIGS. 18 through 22 illustrate how the NTF panel shown can bend along these major bending axes, and the other bending axes parallel thereto. The connection structures of the first and second elements attach together, when formed into the NTF, to form the four major bending or rotating axes, A, B, C, and D. Bending and rotating are used herein as interchangeable terms, and refer to the relative motion of one or more elements with respect to one or more other elements along an axis. The first bending axis A is in rotation about the long sides of the second elements. The second bending axis B is in rotation about the long sides of the second elements that are offset from those that make up the first bending axis. The bending axis A is at right angles to the bending axis B. The third bending axis C is in rotation about the connection structures formed on one of the short sides of the second element, as shown in FIG. 17. The fourth bending axis D is in rotation about the connection structures formed on the other short side of the second element. The bending axes C and D are at right angles to one another.

The four major bending axes allow the interconnected elements to move with respect to one another in a sheet or array form to replicate the draping characteristics of a textile fabric.

Figure 24:
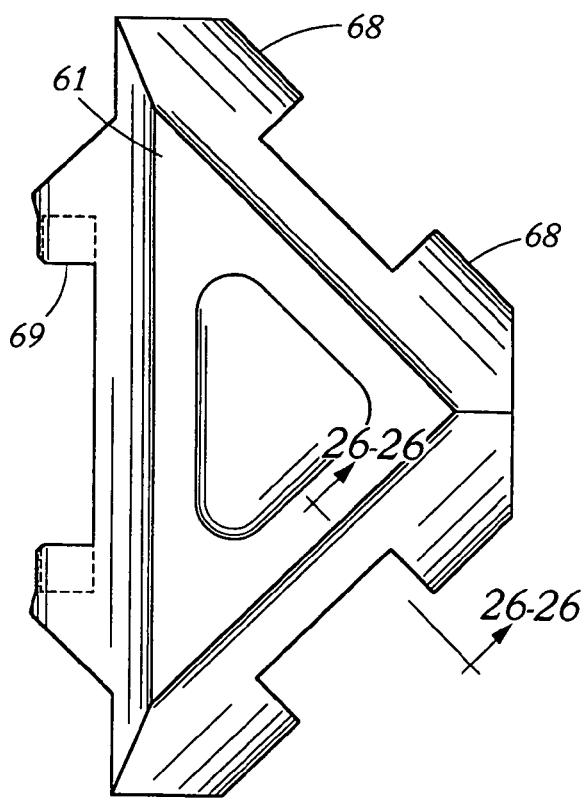
FIG. 24 is a top view of a relatively larger element having the female connector portions.
Figure 26:
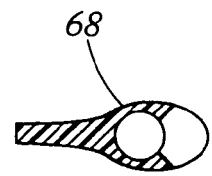
FIG. 26 is a section through II-II of FIG. 24, showing a female receptor groove along an edge of the larger element.

FIG. 27 shows one of the first elements 51 attached to one of the second elements 52. In this instance, the long connection structures 58 of the first element are engaged with the long connection structure 54 of the second element. In detail, the pintle at either end of the long connection structure 54 is received in the corresponding recess 59 formed on the end surfaces of the connection structure 58 formed on the longer side of the first element. The connection structure allows each element to rotate with respect to the other element around the axis of rotation formed by the connection structure. See FIG. 28 for an example of the range of motion allowed between the two parts. The range of motion is limited in both directions by mechanical interference of the web 53 on the second element with the shoulder portion of the first element. The shoulder portion is formed along the connection structure and extends along the notch formed on the longer side of the first element. FIGS. 24 and 26 show a slightly different shoulder portion 68 that is formed around and engages the knuckles or bosses 65 of the first element. While this configuration reduces somewhat the range of motion characterized in FIG. 28, the extra gripping between the connection portions may provided a stronger joint, and thus a tougher NTF.

Figure 31:
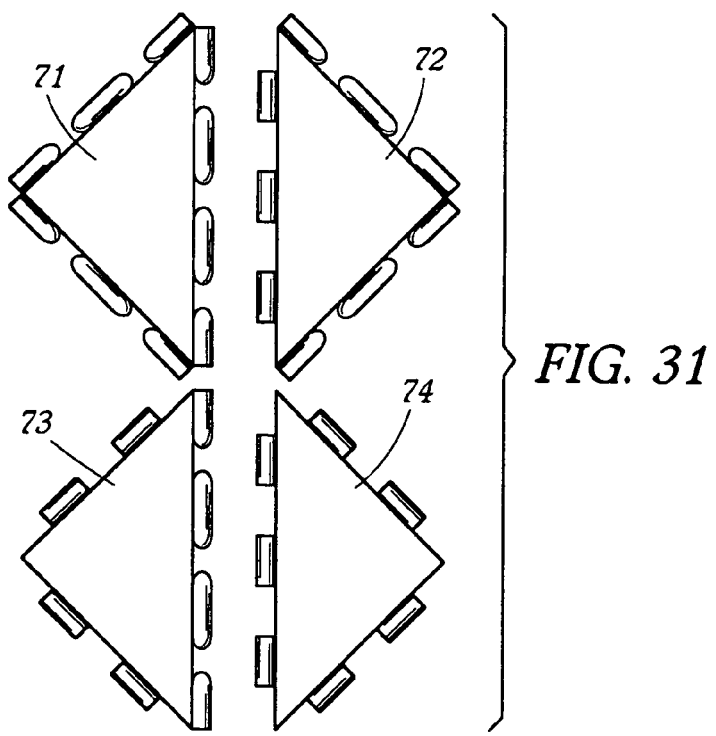
FIG. 31 shows further triangular embodiments of the non-textile fabric elements, each triangle element designed to be interconnected as shown in FIG. 32. The triangular elements shown include one with all female connector portions, one with all male connector portions, and ones with a mix of female and male connector portions.
Figure 32:
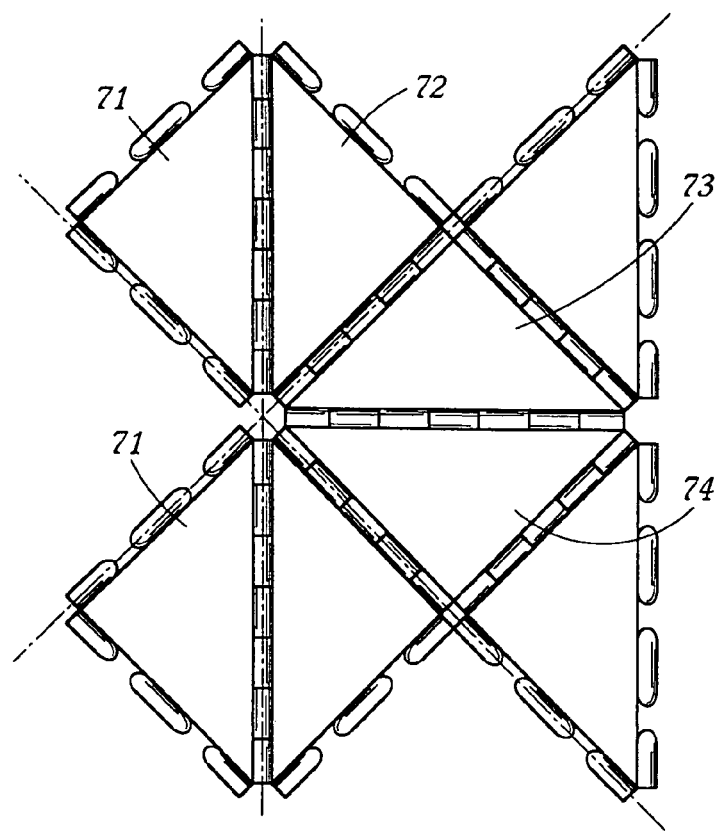
FIG. 32 shows a square parallelogram interconnected assembly of the triangular elements of FIG. 31.

FIGS. 31 and 32 show another embodiment of the present invention. The elements 71, 72, 73 and 74 of this embodiment are all right angle isosceles triangles as with the prior embodiments, but with different combinations of connection structures. For instance, element 71 has all post, pintle, or male connection structures or knuckles along all of its edges. Element 72 has knuckles with pintles along its shorter edges and knuckles with recesses along its longer edge.

Element 73 has recessed or female connection structures along its shorter edges and pintle connection structures along the longer edges. Element 74 has all recesses in its knuckle connection structures along all of its edges. FIGS. 32 illustrate the versatility of the proposed connecting structures. Also, FIGS. 31 and 32 illustrate a central phenomenon of the connecting elements—a series of hinge knuckles (with appropriately shaped end surfaces to engage complimentary shaped end surfaces); each of these knuckles is spaced along a side edge of the triangular element by gaps. In the earlier embodiments, there were perhaps at most two knuckles separate by a single gap, or a single knuckle spaced from the intersections or corners of the sides by a pair of gaps. Here we see each side edge could have a plurality of gaps and a plurality of knuckles. Depending on the relative scale of the elements and the ability to form the connecting structures with such precision and detail, a plurality of knuckles and gaps could be formed on each side of each element.

Also, it is contemplated that the elements used to form an NTF can be made up of one element having all male connection structures and one element having all female connection structures, or each element having both types of female connection structures, or a combination of the above.

The manufacturing of the embodiments described herein is contemplated to be ideally made by a direct forming process where each element is made from a pellet of polymer feedstock in a process requiring very few steps. The direct forming process can be implemented on a series of rollers defining nip regions therebetween (as disclosed elsewhere herein), or by belt rollers (also disclosed elsewhere herein). The belt rollers allow to a greater "nip region" and also a greater dwell time for allowing the elements formed in the direct forming step to cure prior to moving on the to next processing step.

In the direct forming process, the female connection structures can be formed only after the corresponding male connection structures have been entirely formed since the male connection structures form part of the mold for the female connection structures.

The bending axes (or rotating axes) created by the connection of the elements of the present invention allow the NTF to fold, bend and drape similarly to a textile fabric, yet the relatively rigid material the elements are formed of make the NTF very rugged also.

Although the present invention has been described with a certain degree of particularity, it is understood that the present disclosure has been made by way of example, and changes in detail or structure may be made without departing from the spirit of the invention as defined in the appended claims.

The invention claimed is:

1. A non-textile fabric comprising:
    a. at least a first element having at least three sides, each side defining a first connection structure having an axis of rotation, which axes intersect in the form of a right triangle;
    b. at least a second element having at least three sides, each of said sides defining a second connection structure having an axis of rotation, which axes intersect in the form of a right triangle; and
    c. wherein said at least first and at least second elements are attached together using said connection structures, and in turn are attached together with similarly attached first and second elements using said connection structures to form out of at least some intersecting axes of rotation the general shape of a parallelogram in a repeating manner to form the non-textile fabric having at least three major bending axes, said first and second connection structures, when connected together, form a hinge along the connected sides of the first and second elements, the hinge having a solid structure with substantially no gaps or spaces.

2. A non-textile fabric as defined in claim 1, wherein:
    a. said connection structure on said first element comprises at least one knuckle defining at least one pintle; and
    b. said connection structure on said second element includes at least one recess sized for receiving said at least one pintle, whereby a hinge connection is formed between the connection structures of the first and second elements.

3. A non-textile fabric as defined in claim 2, wherein said recess is conical and said pintle is conical.

4. A non-textile fabric as defined in claim 2, wherein said recess and said pintle are formed so the first element and the second element can rotate about one of said major bending axes with respect to each other when in engagement.

5. A non-textile fabric as set forth in claim 1 wherein said right triangle is a right isosceles triangle.

6. A non-textile fabric as set forth in claim 1 wherein said parallelogram is a square.

7. A non-textile fabric comprising:
    a. at least a first element having a side defining a connection structure having an axis of rotation;
    b. at least a second element having at least a side defining a connection structure having an axis of rotation; and
    c. wherein said at least first and at least second elements are attached together using said connection structures, said connection structure on said first element includes at least one knuckle defining at least one recess; and said connection structure on said second element includes at least one knuckle defining at least one pintle shaped to be received in the at least one recess for rotation therein, whereby a hinge connection is formed by the connection structures of the first and second elements, the hinge connection being a substantially solid structure with at most minimal gaps along connected sides of said first and second elements such that the knuckles are kept from flexing with respect to one another to help prevent the pintle from pulling from the recess.

8. The non-textile fabric as set forth in claim 7 wherein said first element has at least three sides, each side defining a connection structure having an axis of rotation, which axes intersect in the form of a right triangle.

9. The non-textile fabric as set forth in claim 8 wherein said second element has at least three sides, each side defining a connection structure having an axis of rotation, which axes intersect in the form of a right triangle.

10. The non-textile fabric as set forth in claim 7 wherein the connection structure of said first element comprises a pair of knuckles.

11. The non-textile fabric as set forth in claim 10 wherein each of said pair of knuckles defines a single recess, whereby the hinge connection has two of the recesses.

12. The non-textile fabric as set forth in claim 11 wherein each recess of the pair of knuckles open inwardly towards one another.

13. The non-textile fabric as set forth in claim 7 wherein the connection structure of the second element comprises a single knuckle.

14. The non-textile fabric as set forth in claim 13 wherein the single knuckle has two pintles, whereby the hinge connection has two pintles.

* * * * *